United States Patent [19]
Sidles

[11] 3,817,306
[45] June 18, 1974

[54] MUD RESISTANT TIRE
[75] Inventor: James Sidles, Richfield, Ohio
[73] Assignee: The B.F. Goodrich Company, New York, N.Y.
[22] Filed: Mar. 5, 1973
[21] Appl. No.: 338,158

Related U.S. Application Data
[62] Division of Ser. No. 173,883, Aug. 23, 1971.

[52] U.S. Cl. .......................................... 152/209 R
[51] Int. Cl. ........................................... B60c 11/08
[58] Field of Search .................... 152/209 R, 209 D

[56] References Cited
UNITED STATES PATENTS
2,240,542   5/1941   Bourdon ..................... 152/209 R
3,000,421   9/1961   Hack et al ................... 152/209 R
3,030,998   4/1962   Jensen ........................ 152/209 R Primary Examiner—James B. Marbert
Attorney, Agent, or Firm—Joseph Januszkiewicz

[57] ABSTRACT

A tire whose tread has a mud resistant construction. Sections of the tire tread between the rib design utilizes a resilient flexible material having a plurality of angularly disposed thin flexible fins with narrow parallel grooves therebetween which cooperate to trap air on compression of the fins to minimize mud build-up.

4 Claims, 3 Drawing Figures

MUD RESISTANT TIRE

CROSS REFERENCE TO RELATED APPLICATION

This application is a division of copending application Ser. No. 173,883, filed Aug. 23, 1971.

BACKGROUND OF THE INVENTION

The design and tread construction of mud and snow tires is directed to variations in rib, cleat design and their relative positioning on the tire. As a result, a great many types of lugs and ribs were designed and used.

The present invention is concerned with a tread design which inhibits the build-up of mud on the tread portion through the use of elastomers self-cleaning sections between the ribs, rather than relying on rib construction only. The valley areas between ribs are either molded or contoured to have mud inhibiting fin construction which eliminates mud pick-up and mud build-up. This construction is particularly useful in farm type tires, tractor tires, military tires and construction machinery tires.

SUMMARY OF THE INVENTION

This invention relates to tires that have conventional ribs with valleys therebetween wherein such valleys have sections of elastomeric material either adhered thereto or molded therein, which sections have a plurality of transversely extending thin flexible fins. The fins are disposed at an acute angle relative to the valley surface to which it is adhered or molded in. The fins alternate with narrow grooves or slits with the fins having generally parallel surfaces. The fins are of uniform thickness throughout. The flexible thin fins cooperate with adjacent fins and the narrow slits such that on their deflection they trap air and facilitate a self-cleaning action when used in the environment of mud.

DETAILED DESCRIPTION

Figure 3:
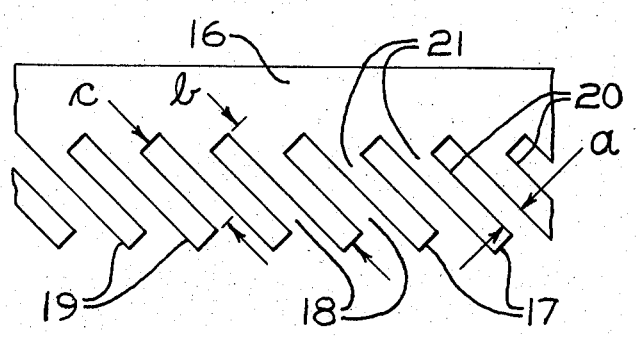
FIG. 3 is an enlarged fragmentary side elevational view of a portion of the construction of the valley portion of the tire showing the construction five times its normal size.

Referring to the drawings wherein like reference characters designate like or corresponding parts throughout the several views, there is shown in FIG. 3 a section of resilient elastomeric material constructed in accordance with the present invention, which section of material is molded into a tire or molded as a section of material and adhered to the valley of a tire between the respective rib sections.

The tire 10 comprises a carcass body with side walls 11 (only one shown in FIG. 1) terminating at the beads 12. The outer peripheral portion of the tire has a tread portion provided with a series of rib members 14 which are suitably disposed circumferentially around the tire. The ribs or lugs 14 are circumferentially spaced with valleys therebetween such that the valleys have cemented thereto or preferably molded therein sections of materials comprising sections of fins 15 (FIG. 2). FIG. 2 illustrates an enlarged cross-sectional view of the tire, with the actual dimension of the fins being proportioned similarly to that described with respect to FIG. 3. A section of the elastomeric material is shown in FIG. 3 wherein it includes a flexible planar portion 16 that is shown horizontally disposed which may assume the contour of the shape of the article to which it is bonded. Such portion 16 has a plurality of downward and rearwardly extending fins 17. The fins 17 extend transversely across the section of material defining grooves or slits 18 between adjcent pairs of fins 17. Each fin 17 is of the same uniform thickness "$a$" throughout its height designated "$b$" in FIG. 3. The fins extend downwardly and rearwardly from the planar portion 16, with each fin having a front surface portion 19 and a rear surface portion 20. All the front and rear surfaces 19 and 20 of the fins 17 are parallel and disposed at approximately 45° with respect to the horizontal, however, as such section of material is adhered or molded to the surface of the valley of a tire it assumes the general contour of the valley or surface to which it is adhered. When considering the height of the fins, the measurement along the front surface may be designated "$b$" (FIG. 3) whereas the measurement along the rear surface may be designated "$c$." For simplicity of understanding the height will be understood to be represented by measurement "$c$." The depth of the slits 18 may also be designated "$c$," which dimension is the same as the height of the fins 17. The length of the fins 17 and the slits 18 are determined by the width of the surface to be covered. The base 21 of the respective fins 17 cooperate with the slits 18 to trap air to facilitate the self-cleaning action of the tire.

The operation of the tire in the environment of mud, as where the tire's valley has molded therein or adhered thereto sections of the described material is such that as the tire rolls into engagement with the ground surface the fins 17 yield as they are pressed into the mud, trapping air at the base of the fins. As the ground contacting portion of the tire is raised out of the mud surface, the air acts to break up the suction that would ordinarily exist. The sides of the fins would open and allow the air to flow into the groove or slits and facilitate the peeling off and breaking off of the mud. The precise action of the fins and phenomenon occurring is not fully understood, however, tests made of such surfaces in use have shown that because of the above-described construction the amount of mud picked up by such tire is reduced tremendously. As an example of the dimension depicted by FIG. 3, dimension "$a$" which is the width of the groove or slit 18 as well as the thickness of the fin is .035 inch, while the depth of the groove or slit 18, or height of the fin 17, dimension "$c$," along its rear surface is .15 inch, and the height of the fin 17 along its forward face 15 which is dimension "$b$" is .23 inch. FIG. 3 illustrates the size of the fins and grooves or slits 18 magnified approximately five times the actual size.

Figure 1:
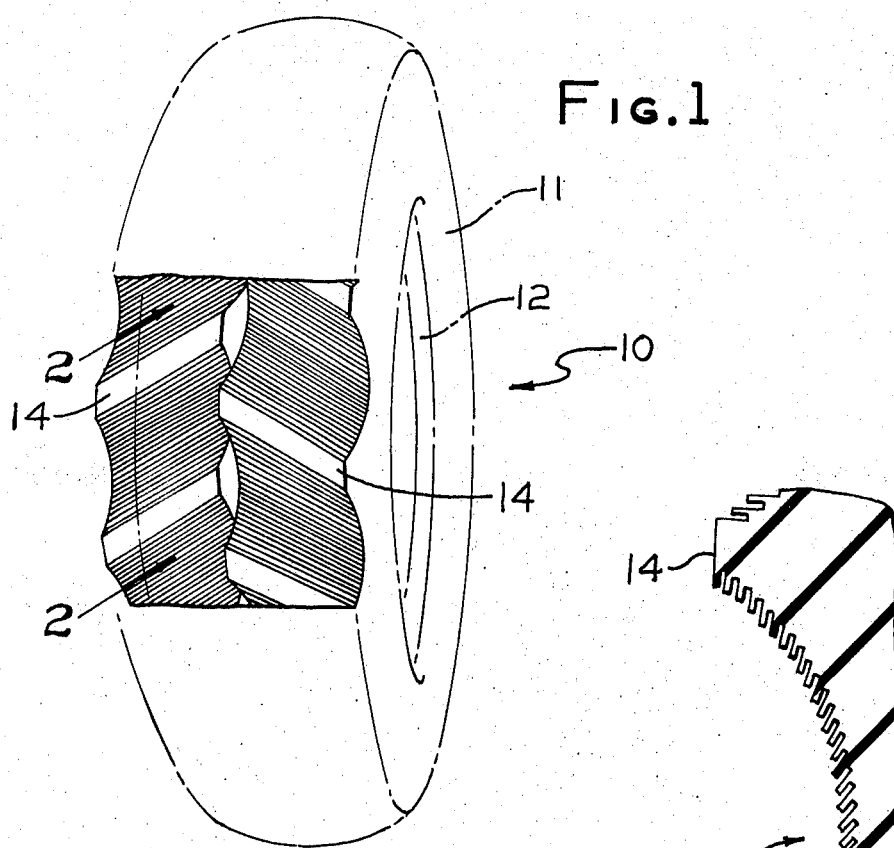
FIG. 1 is a perspective view of a tire showing the entire tire in phantom lines and a section broken away showing the conventional ribs with portions therebetween constructed in accordance with the principles of the present invention.
Figure 2:
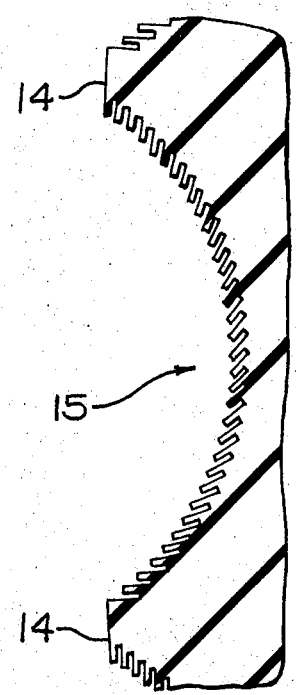
FIG. 2 is an enlarged cross-sectional view of the tractor tire taken on lines 2—2 of FIG. 1.

The fin structure in FIGS. 1 and 2 is larger than actually proportioned; however, such construction in FIG. 1 is shown to illustrate the general overall structure in use.

In a test conducted with a tractor tire, half of whose valleys were covered with sections of fin structures and the remaining half of the valleys being smooth or bare, it was shown that mud was built up in the bare valley portions of the tractor tire, whereas little or no build-up of mud occurred in the fin structured portions of the tire when such tire traversed a field of mud.

The build-up of mud on such smooth surface resulted in picking up of weeds, rocks, twigs with a packing down between the ribs or lugs of the tire, destroying traction. The invention contemplates the use of a resilient flat body (FIG. 3) which may be cemented to the valley of a tire between ribs 14—14, or vulcanized thereto to make an integral unit. Such construction inhibits the build-up of mud to a significant degree.

Various modifications are contemplated and may obviously be resorted to by those skilled in the art without departing from the described invention, as hereinafter defined by the appended claims as only a preferred embodiment thereof has been disclosed.

I claim:

1. A tire having a tread portion and a sidewall portion, said tread portion having a plurality of circumferentially spaced lugs and a plurality of circumferentially spaced concave valleys therebetween, each of said valleys having a plurality of spaced thin flexible fins extending transversely across said valleys, each of said fins being of substantially uniform width, adjacent fins defining slits therebetween, and said fins disposed at an acute angle relative to the surface of the adjacent valley as defined by the circumferentially spaced concave valleys between said spaced lugs.

2. A tire as set forth in claim 1 wherein said fins extend across the full face of said tread portion.

3. A tire having a tread portion and a sidewall portion, said tread portion having a plurality of circumferentially spaced ribs, the area of said tread between adjacent ones of said ribs defining a concave valley, each of said valleys having its surface contoured with a plurality of spaced thin flexible fins, each of said fins being of substantially uniform thickness, and said fins inclined at an acute angle relative to the adjacent valley surface.

4. A tire as set forth in claim 3 wherein said acute angle is approximately 45°.

* * * * *